(No Model.) 3 Sheets—Sheet 1.
G. N. TODD.
PROCESS OF MAKING PICKER STEMS AND CLEANERS.

No. 423,540. Patented Mar. 18, 1890.

Witnesses.
W. Rossiter
Will R. Onohundro

Inventor
George N Todd
By Jno. G. Elliott
Atty.

N. PETERS, Photo-Lithographer, Washington, D. C.

(No Model.) 3 Sheets—Sheet 2.
G. N. TODD.
PROCESS OF MAKING PICKER STEMS AND CLEANERS.
No. 423,540. Patented Mar. 18, 1890.
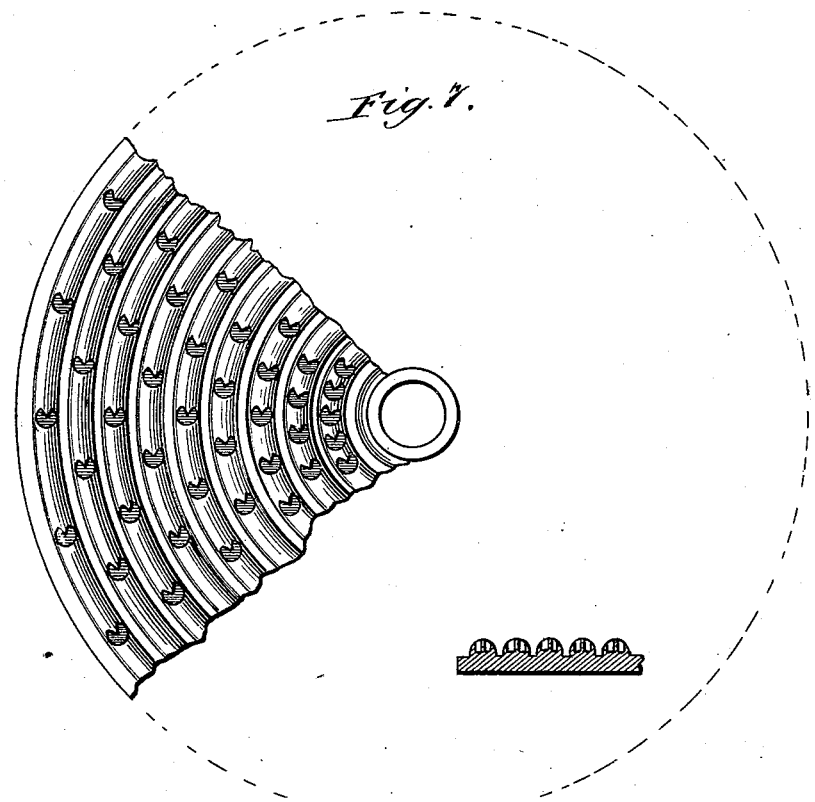
Fig. 7.
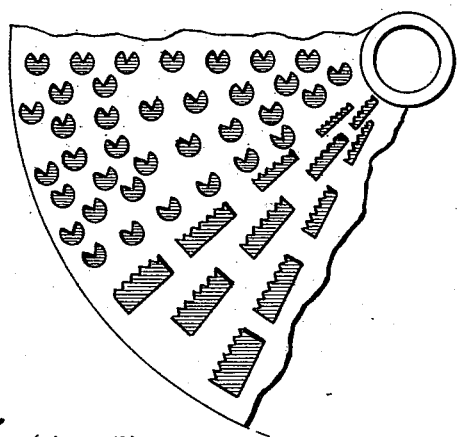
Fig. 8.
Witnesses.  Inventor
George N. Todd
By Jno. G. Elliott
Atty.

(No Model.) 3 Sheets—Sheet 3.
G. N. TODD.
PROCESS OF MAKING PICKER STEMS AND CLEANERS.
No. 423,540. Patented Mar. 18, 1890.
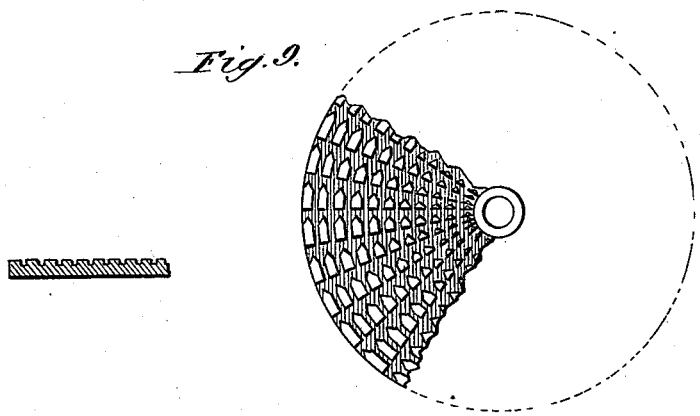
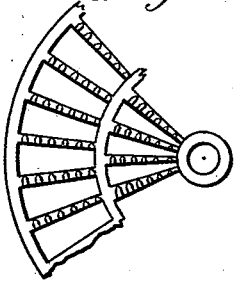
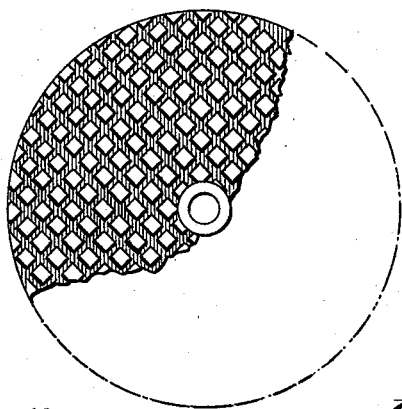
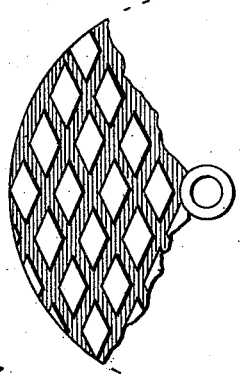
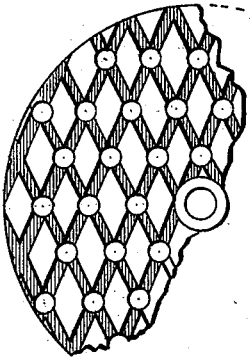
Witnesses:
Inventor
George N. Todd
By Jno. G. Elliott
Atty.

UNITED STATES PATENT OFFICE.

GEORGE N. TODD, OF CHICAGO, ILLINOIS, ASSIGNOR TO THE TODD COTTON HARVESTER COMPANY, OF ILLINOIS.

PROCESS OF MAKING PICKER-STEMS AND CLEANERS.

SPECIFICATION forming part of Letters Patent No. 423,540, dated March 18, 1890.

Application filed September 20, 1887. Serial No. 250,268. (No specimens.)

*To all whom it may concern:*

Be it known that I, GEORGE N. TODD, a citizen of the United States, residing in Chicago, county of Cook, and State of Illinois, have invented certain new and useful Improvements in Process for Making Picker-Stems and Cleaners, of which the following is a specification.

This invention relates to improvements in the manufacture of picker-stems designed for use in cotton-harvesters, and also cleaner devices employed in that class of machines for removing the gathered cotton from the stems. The surface of both the stems and cleaners is generally toothed or provided with projections answering all the purposes of a tooth; and the object of this invention is, therefore, to produce such toothed or notched surface having any desired configuration in a new and novel manner, whereby the cost of production of such devices will be materially lessened, Another object is to produce such toothed surface by displacing the metal of a cast blank away from the teeth or points of the teeth, thereby forming separate but integral teeth upon the body of the cast blank. I attain this object by the steps and order of steps, hereinafter fully set forth, and have illustrated in the accompanying drawings a few of the various forms of picking-surface resulting from the carrying out of my process, in which drawings—

Figure 1:
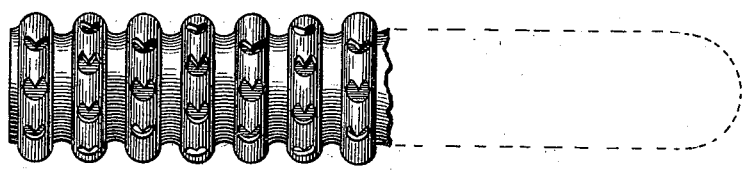
Figure 2:
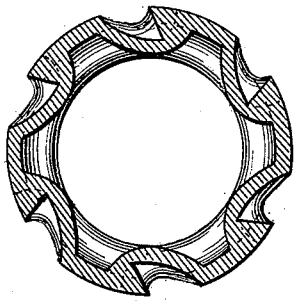
Figure 3:
Figure 5:
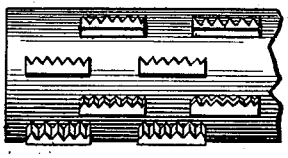
Figure 4:
Figure 6:
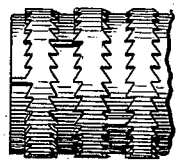

Figure 1 represents a side elevation of a completed picker-stem embodying my invention, having circumferential toothed ribs formed thereon; Fig. 2, a transverse section thereof; Fig. 3, a side elevation of a picker-stem having a plain surface; Fig. 4, a transverse section thereof; Figs. 5 and 6, modified forms of picker-stems, showing the teeth projecting above the surface of the stem; Figs. 7 and 8, detail views of cleaner-disks embodying my invention, and Figs. 9, 10, 11, 12, and 13 similar views of modified forms of cleaners.

In carrying out my invention, I first cast a blank base or body of malleable metal having the desired general configuration of the finished article, and then stamp, engrave, or otherwise displace from the surface of such blank portions of the metal to form a series of depressions of various contours, and in such manner as to leave projecting from one side of each depression teeth pointing in the direction in which the stem or cleaner is designed to rotate when completed, so that when the cotton or any other fibrous material comes in contact with said stem it will be engaged and held by these teeth.

In a stem or cleaner produced in this manner it will be observed, from an inspection of Figs. 1 to 8, inclusive, that for every tooth a separate and distinct depression is necessarily made, and that therefore the teeth may be formed in any desired series or arrangement, and may be regularly or irregularly distributed over the surface. Instead, however, of forming such a series of disconnected depressions upon the surface of the blank base outlining the teeth the said surface may be grooved or otherwise cut or stamped at regular intervals throughout the surface, so as to form grooves so directed as to intersect each other at regular intervals throughout the surface, and thereby leave the teeth projecting above the cut surface of the blank. These depressions or grooves may be formed in any well-known and convenient manner so long as the metal of the blank is displaced either by ordinary stamping or cutting machines, or by the use of acids commonly employed in the engraver's art, the stamping process, whether it results in cutting out the metal or simply compressing it, being in effect a displacing operation.

Having described my invention, what I claim, and desire to secure by Letters Patent, is—

1. The herein-described method for producing picker-stems and cleaners, the same consisting in first casting a base or body, the teeth-supporting surface of which is plain, and then displacing the metal of said surface, substantially as described, so as to outline and form the teeth integrally with said base.

2. The herein-described method for producing picker-stems and cleaners, the same consisting in first casting a base or body, the teeth-supporting surface of which is plain, and then cutting into said surface, so as to form the teeth standing above the cut surface, substantially as described.

3. The herein-described method for producing picker-stems and cleaners, the same consisting in first casting a base or body the teeth-supporting surface of which is plain, and then grooving the base so as to form teeth standing above the bottoms of said grooves, substantially as described.

GEORGE N. TODD.

Witnesses:
WILL R. OMOHUNDRO,
W. W. ELLIOTT.